United States Patent
Hecker et al.

(10) Patent No.: US 10,137,875 B2
(45) Date of Patent: Nov. 27, 2018

(54) ELECTRIC EQUIPMENT OF A VEHICLE, COMPRISING AN AT LEAST PARTLY ELECTRIC BRAKING AND STEERING DEVICE WITH HIGH AVAILABILITY

(71) Applicant: KNORR-BREMSE Systeme fuer Nutzfahrzeuge GmbH, Munich (DE)

(72) Inventors: Falk Hecker, Markgroeningen (DE); Michael Herges, Munich (DE); Frank Schwab, Kieselbronn (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 63 days.

(21) Appl. No.: 15/466,292

(22) Filed: Mar. 22, 2017

(65) Prior Publication Data
US 2017/0267221 A1    Sep. 21, 2017

Related U.S. Application Data

(63) Continuation of application No. PCT/DE2015/000444, filed on Sep. 14, 2015.

(30) Foreign Application Priority Data

Sep. 22, 2014  (DE) .......................... 10 2014 013 756

(51) Int. Cl.
*B60T 8/88*  (2006.01)
*B60T 7/08*  (2006.01)
(Continued)

(52) U.S. Cl.
CPC .............. *B60T 8/885* (2013.01); *B60T 7/085* (2013.01); *B60T 13/662* (2013.01);
(Continued)

(58) Field of Classification Search
CPC .... B60T 8/885; B60T 13/683; B60T 2260/02; B60T 2270/403; B60T 2270/414; B62D 5/0457

See application file for complete search history.

(56) References Cited

U.S. PATENT DOCUMENTS

| 6,015,193 | A | 1/2000 | Vogel et al. | |
|---|---|---|---|---|
| 2007/0170774 | A1* | 7/2007 | Gerum | B60T 13/66 188/140 R |
| 2007/0228814 | A1* | 10/2007 | Miller | B60T 7/20 303/7 |

FOREIGN PATENT DOCUMENTS

| DE | 10 2008 014 459 A1 | 9/2009 |
|---|---|---|
| DE | 10 2014 107 399 A1 | 11/2015 |

(Continued)

OTHER PUBLICATIONS

International Preliminary Report on Patentability (PCT/IB/373 and PCT/ISA/237) issued in PCT Application No. PCT/DE2015/000444 dated Mar. 28, 2017, including English translation of document C2 (German-language Written Opinion (PCT/ISA/237)) previously filed on Mar. 22, 2017 (8 pages).

(Continued)

*Primary Examiner* — Vishal R Sahni
(74) *Attorney, Agent, or Firm* — Crowell & Moring LLP

(57) ABSTRACT

A braking system and a method of operating such a braking system are provided for a vehicle having at least partly electric braking, a steering device containing an electric or electromechanical steering device, an electronic steering controller and an electric steering adjuster and containing a service brake device. The system includes an electropneumatic service brake device containing an electropneumatic service brake valve device, an electronic brake controller, electropneumatic modulators, pneumatic wheel brake actuators, a service brake actuating element, and at least one (Continued)

electric channel (130) with at least one electric brake value transmitter which senses activation of the service brake actuating element. The at least one electric brake value transmitter produces actuation signals which are relayed to the electronic brake controller. The electronic brake controller causes a first actuation force to be applied to at least one control piston of the service brake valve device to control at least one double seat valve of the service brake valve device to generate pneumatic braking pressures or brake control pressures for the pneumatic wheel brake actuators. The electronic controls are further configured to generate a second actuation force on the at least one control piston when a brake request independent of the driver's request exists, independent of a driver brake request. The electropneumatic service brake device is supplied with energy independently from energy supplied to the electropneumatic service brake valve device and the electric or electromechanical steering device.

20 Claims, 8 Drawing Sheets

(51) Int. Cl.
*B60T 13/66* (2006.01)
*B60T 13/68* (2006.01)
*B62D 5/04* (2006.01)

(52) U.S. Cl.
CPC .......... *B60T 13/683* (2013.01); *B62D 5/0457* (2013.01); *B60T 2260/02* (2013.01); *B60T 2270/403* (2013.01); *B60T 2270/414* (2013.01)

(56) References Cited

FOREIGN PATENT DOCUMENTS

| EP | 0 482 374 A1 | 4/1992 |
| EP | 0 999 117 A2 | 5/2000 |
| EP | 2 570 312 A1 | 3/2013 |
| EP | 2 570 317 A1 | 3/2013 |

OTHER PUBLICATIONS

International Search Report (PCT/ISA/210) issued in PCT Application No. PCT/DE2015/000444 dated Feb. 1, 2016 with English-language translation (six (6) pages).

German-language Written Opinion (PCT/ISA/237) issued in PCT Application No. PCT/DE2015/000444 dated Feb. 1, 2016 (six (6) pages).

German-language Office Action issued in counterpart German Application No. 10 2014 013 756.2 dated May 18, 2015 (four (4) pages).

* cited by examiner

ELECTRIC EQUIPMENT OF A VEHICLE, COMPRISING AN AT LEAST PARTLY ELECTRIC BRAKING AND STEERING DEVICE WITH HIGH AVAILABILITY

CROSS REFERENCE TO RELATED APPLICATIONS

This application is a continuation of PCT International Application No. PCT/DE2015/000444, filed Sep. 14, 2015, which claims priority under 35 U.S.C. § 119 from German Patent Application No. 10 2014 013 756.2, filed Sep. 22, 2014, the entire disclosures of which are herein expressly incorporated by reference.

BACKGROUND AND SUMMARY OF THE INVENTION

The invention relates to electric equipment of a vehicle having an at least partially electric braking and steering device containing an electric or electro-mechanical steering device.

A combined and at least partially electric braking and steering device of a vehicle is known from the genus-forming document EP 0 999 117 A2. There is provision here that in the event of a fault in a steering system component, in particular a steering actuator, individual wheels for maintaining the steerability of the vehicle are selectively braked. As a result, the fault tolerance in the event of a failure of a steering system component is improved by virtue of the fact that an attempt is made to at least partially replace the failed steering effect of the respective steering system component by generating a yawing moment by selective braking of individual wheels. In order to increase the fail safety, the power supply of the combined braking and steering device is redundant in the form of a further vehicle battery. Furthermore, wheel modules in which braking and steering actuators are accommodated also each have a separate energy store. In this context, the electronic steering and braking controller and the energy supply are configured completely redundantly, i.e. all the electronic system components and the energy supply are each present in duplicate at least. As a result, when an electronic system component or energy supply fails, the respective still intact system component or energy supply can completely take over the requested function. A disadvantage of this system configuration is the relatively costly installation and the high component costs and system costs. As a result, such concepts are compatible with series production only to a limited degree. Furthermore, it is necessary to ensure that no faults occur simultaneously in the redundant systems. The steering and braking inputs for the electric braking and steering device are also generated by the driver.

On the other hand, for a considerable time there have been to a certain extent driver assistance systems such as traction control systems (TCS), emergency braking assistance systems (AEBS), adaptive cruise control systems (ACC) or vehicle movement dynamics control systems (ESP) which can be used to carry out steering and/or braking interventions automatically and independently of the driver, in order to ensure safety specifications such as e.g. a certain minimum distance from the vehicle traveling ahead, a certain minimum braking effect as well as a certain minimum level of driving stability.

For future vehicle traffic, concepts are also planned which permit vehicles in public road traffic also to move completely without intervention by a driver, in the manner of an "autopilot". In this context, a plurality of vehicles are to drive under automatic control one behind the other at a distance which is smaller than an actually prescribed safety distance (platooning). This is possible only if all the vehicles can brake simultaneously and with the same deceleration by virtue of suitable communication between them.

Within the scope of such (partially) autonomous vehicle concepts it is therefore necessary for the electric braking and steering device to be able to receive and implement braking and steering requests electronically, specifically even when there is a fault within the electronic controllers or electrics. Therefore, a fault-tolerant controller of the braking and steering device is required so that when faults occur in the brake system the core functions of steering and braking can be ensured even without (intervention by) a driver, at least over a certain time, until a safe system state is reached, for example at least a stationary state of the vehicle or a parked state with permanently applied brakes.

In electronic or electronically brake-pressure-regulated brake systems (EBS) which are installed in series at the time of this patent application, the electronic control device of said brake systems switches off when a fault occurs in the electric service brake circuit (e.g. failure of the electric energy source or of the electronic control device itself) and switches over to a purely pneumatic backup controller by using the at least one pneumatic service brake circuit. However, with a pneumatic service brake circuit only the driver can brake the vehicle by activating the service brake activation element. Such a system is not suitable for (partially) autonomous or automated driving (autopilot) as described above, since, when such a fault occurs, automated controlled steering and braking interventions are no longer possible.

The German patent application with the file number DE 102014112014.0 which is not yet published and is by the same patent applicant deals with the case of a pneumatic or electropneumatic service brake device having the possibility of being activated not only by a driver's braking request but also automatically by a driver assistance system such as, for example, an emergency braking assistant or an adaptive cruise control system (ACC). In this context, use is made of a service brake valve device which is expanded compared to the prior art or expanded foot-operated brake module with at least one pneumatic channel in which a control piston can be loaded not only by a first activation force generated by activation of the foot-operated brake pedal but also additionally by a second activation force which is generated electronically as a function of driving operation conditions. In particular, the expanded service brake valve device is provided with an electronic pressure control or regulating device with which the brake pressure or brake control pressure which is generated in the at least one pneumatic channel can be increased or reduced independently of the driver by the second activation force which acts on the control piston.

In a brake system which is known from DE 10 2014 107 399 A1, the electronic brake actuation system is configured with a dual circuit or multiple circuit in such a way that each brake circuit serves only certain axles or wheels. In the event of a failure of one of the brake circuits, therefore just a portion of the possible braking effect can be generated electronically. If a brake circuit failure were to occur, for example, during strong braking of an automatically controlled vehicle column (platooning) as described above, a rear-end collision would be unavoidable.

Taking this as a basis, the object of the invention comprises developing an at least partially electric braking and steering device in such a way that when actuation occurs it has a level of fail safety which is as high possible and ensures the strongest possible braking effect without intervention by the driver, for example by using a driver assistance system or by an autopilot device.

According to the invention there is provision that an electropneumatic service brake device, in particular an electronic or electronically brake-pressure-regulated brake system (EBS), is provided as a service brake device, which contains an electropneumatic service brake valve device, an electronic brake control device, electropneumatic modulators and pneumatic wheel brake actuators. The electronic brake control device electrically controls the electropneumatic modulators in order to generate pneumatic brake pressures or brake control pressures for the pneumatic wheel brake actuators wheel-specifically, axle-specifically or side-specifically. The electropneumatic service brake valve device has a service brake activation element and, within at least one electric service brake circuit, at least one electrical channel with at least one electric brake value generator which can be activated by the service brake activation element and has the purpose of outputting activation signals as a function of activation of the service brake activation element. The electropneumatic service brake valve device also has at least one electronic evaluation device which receives the activation signals and inputs braking request signals into the electronic brake control device as a function of the activation signals. The electropneumatic service brake valve device further has within at least one pneumatic service brake circuit, at least one pneumatic channel in which, by activating the service brake activation element on the basis of a driver's braking request, at least one control piston of the service brake valve device is loaded with a first activation force. The control piston directly or indirectly controls at least one double seat valve of the service brake valve device having an inlet seat and an outlet seat, in order to generate pneumatic brake pressures or brake control pressures for the pneumatic wheel brake actuators. The electropneumatic service brake valve device also is capable of generating a second activation force independently of a driver's braking request are provided, acting on the at least one control piston in parallel with the first activation force (in the same direction as or in the opposite direction to said force) when a braking request which is independent of the driver's request is present. The electropneumatic service brake device is supplied with electrical energy by a first electrical energy source or by a first energy supply circuit, which energy source is independent of a second electrical energy source or a second energy supply circuit. The first electrical energy source or the first energy supply circuit supplies the electropneumatic service brake valve device with electrical energy, and the electric or electro-mechanical steering device is supplied with electrical energy by the second electrical energy source or by the second energy supply circuit.

Generally, a vehicle which is suitable for autonomous or automated driving requires at least one steering device which can be influenced electrically, for example in the form of steer-by-wire without a continuous mechanical connection between the steering wheel and the steering gear mechanism or in the form of a superimposition steering system in which even though there is a continuous mechanical connection between the steering wheel and the steering gear mechanism, a steering torque which is generated by an electric steering actuator is superimposed on the steering torque generated by the driver via the mechanical connection (steering torque superimposition). In electric superimposition steering systems in heavy utility vehicles, a conventional hydraulic power steering system is usually also connected downstream, which power steering system amplifies the driver's specifications and the superimposition steering systems in order thereby to be able to apply the high steering forces. The electric or electro-mechanical steering device which is used for the invention is embodied in such a way. Furthermore, there is also a need for a brake device which can be influenced electrically. An electropneumatic service brake device which is used for the invention and has an EPS function, in particular an electronic or electronically brake-pressure-regulated brake system (EBS) with an ESP function satisfies this requirement.

The basic principle of "steering by braking" is sufficiently known and is described, for example, in EP 0 999 117 A2 which has already been mentioned above. In this context use is made of the fact that a vehicle can be steered even by braking individual wheels or wheel groups. Therefore, a suitably designed service brake device can serve as a redundancy for the steering device at least for a limited time period.

A suitable service brake device constitutes an electropneumatic service brake device such as is used for the invention and which is able to input brake pressure into pneumatic wheel brake actuators in a wheel-specific or wheel-group-specific fashion without involving the driver. This involves electropneumatic service brake devices which can carry out a driving stabilization function such as ESP (electronic stability program) or ABS (anti-lock brake system) in combination with TCS (traction slip control system) valves on the front axle and rear axle.

In order to ensure "steering" and "braking" in an automated fashion, i.e. on the basis of authority other than the driver's (autopilot device) even in the case of a fault in the electrical energy supply, in a vehicle with the equipment according to the invention, at least two energy supply circuits are necessary which are configured in such a way that in the case of a fault in one of the circuits there is still sufficient electrical energy present in order to be able to continue to operate the combined steering and braking device. An autopilot device is to be understood in the following as being a device which closed-loop or open-loop controls at least the steering and braking device of the vehicle without involvement of the driver, in particular as a function of the driving operation conditions. The same also applies to a vehicle movement dynamics controller such as e.g. adaptive cruise control (ACC) by which the distance or the relative speed with respect to a vehicle traveling ahead is kept constant (emergency braking assistant (AEBS) or vehicle movement dynamics controller (ESP) with the aid of which steering and/or braking interventions can be carried out automatically and independently of the driver, in order to ensure safety specifications such as e.g. a certain minimum distance from a vehicle traveling ahead, a certain minimum braking effect as well as a certain minimum level of driving stability.

In the case of the invention, an electropneumatic service brake device, in particular with an ESP function, serves as a redundancy for the failed electric or electro-mechanical steering device. Different variants of electropneumatic service brake devices are suitable for this.

According to a first variant of the electropneumatic service brake device, the brake pressure in pneumatic wheel brake actuators of the vehicle, and, if appropriate, in pneumatic wheel brake actuators of a trailer of the vehicle, is closed-loop or open-loop controlled purely pneumatically only in the event of a fault in the electric service brake circuit and in the event of activation of the brake pedal by the driver, and otherwise is always closed-loop or open-loop controlled electrically. This is the case in an electronically brake-pressure-regulated EBS system which is always equipped with an ESP function.

According to a second variant of the electropneumatic service brake device, the brake pressure in pneumatic wheel brake actuators of the vehicle, and, if appropriate, in pneumatic wheel brake actuators of a trailer of the vehicle, is controlled in the normal case or in the uncritical operating case purely pneumatically by activating the brake pedal. The electric part of the electropneumatic brake device then consists in at least one additional vehicle movement dynamics controller which engages electrically only when critical situations such as e.g. locking of the brakes, skidding, yawing, oversteering, understeering occurs, using a braking intervention or steering braking intervention, e.g. in the form of ESP or ABS with traction control system valves on all the axles.

In a third variant of the electropneumatic service brake device, the brake pressure is open-loop or closed-loop controlled in some of the pneumatic wheel brake actuators of the vehicle and, if appropriate, of the trailer of the vehicle according to the first variant, and the brake pressure is open-loop or closed-loop controlled in some other of the pneumatic wheel brake actuators of the vehicle, and if appropriate, of the trailer of the vehicle.

In the event of the electropneumatic service brake device having an ESP function, a steering wheel angle sensor, a yaw rate sensor and a lateral acceleration sensor are already present and can be used to measure and monitor the effect of a steering braking intervention. The steering wheel angle sensor can furthermore also be used to sense the driver's steering request in order, if the driver himself is steering, to form a redundancy for a power steering system or the steering actuator of steer-by-wire steering device for steering braking operations. Therefore, in the case of a superimposition steering system with downstream hydraulic power steering system, the steering braking can be used in a supportive fashion if the hydraulic power steering system fails.

Alternatively or additionally, a sensor system is preferably provided for sensing the steering torque generated by the driver, for example a sensor for sensing the steering angle of the steered wheels for sensing the steering effect and/or a steering torque sensor in the steering column.

In order to ensure a high level of fail safety of the electric or electro-mechanical steering device with respect to its automatic actuation without involvement of a driver by the autopilot device or the driver assistance system, the electropneumatic service brake device is supplied with electrical energy by a first electric energy source or a first energy supply circuit which is independent of a second electric energy source or of a second energy supply circuit which supplies the electric or electro-mechanical steering device with electrical energy.

In this context, the steering requests of the autopilot device or of the driver assistance system which are generated in an automated fashion and without the involvement of the driver are input not only into the steering device but also into the electropneumatic brake device or "also read in" by the electropneumatic brake device.

If a fault then occurs in the second electric energy supply circuit or in the second electric energy source which supplies the steering device, or in the event of a fault in the steering device itself, this is detected by the electronic brake control device of the electropneumatic service brake device, e.g. through the absence of messages of the steering device, (e.g. on a databus to which both devices are connected), or by an explicit fault message of the steering device. It is also possible that the steering device is monitored by another control unit, and the fault is then communicated to the electropneumatic service brake device or the electronic brake control device thereof. In all these cases, the electropneumatic service brake device then implements the steering specifications or the steering request of the autopilot device or of the driver assistance system.

It is also possible that another control unit detects the failure of the steering device or its energy supply, calculates the brake pressures necessary for the steering braking and transmits them as wheel-specific or wheel-group-specific brake pressure specifications to the electropneumatic service brake device which then implements them. This other control unit can also be a part of the autopilot device.

Furthermore, it is to be ensured that the braking requests which are generated by the autopilot device continue to remain functionally capable even in the event of a fault in the electric energy supply or in the electric service brake circuit of the electropneumatic service brake device.

The invention proposes for this purpose that the pneumatic or electropneumatic service brake valve device which is always present in an electropneumatic service brake device or the foot-operated brake module which is present there in any case be modified in such a way that said device or module permits sensing of the brake pedal position and can modify the brake pressure output by at least one pneumatic channel of the service brake valve device, independently of activation of the brake pedal.

Such a pneumatic or electropneumatic service brake valve device which is then "active" or such an "active" foot-operated brake module as a synonym is disclosed in the abovementioned and until now unpublished German patent application having the file number DE 10 2014 112 014.0 of the applicant, wherein the disclosure thereof content in this respect is fully incorporated into the patent application which is present here.

The pneumatic part of this "active" foot-operated brake module functions as a service brake valve of a pneumatic service brake device and generates in response to activation of the brake pedal single-circuit or multi-circuit pneumatic brake pressures or brake control pressures in at least one pneumatic service brake circuit of the electropneumatic service brake device. At least if the electropneumatic service brake device is an electrically regulated or brake-pressure-regulated brake system (EBS), the active foot-operated brake module has a sensor system for sensing the driver's braking request in the form of an electric brake value generator. This sensor system is part of the electrical channel of the "active" foot-operated brake module or of the electric service brake circuit of the electropneumatic service brake device and, during fault-free operation, communicates the service braking request of the driver which is input via the service brake pedal.

So that the braking request of the driver is implemented even in the event of a fault in the electrical channel of the service brake valve device or in the electric service brake circuit of the electropneumatic service brake device, in the case of an electronically regulated brake system (EBS) the brake pressures or brake control pressures which are input into the at least one pneumatic service brake circuit are used as a backup.

The "active" foot-operated brake module also has the electrical channel and an electronic pressure open-loop control or closed-loop control device with which it can modify without the involvement of the driver, in particular increase or generate, brake pressures or brake control pressures in at least one pneumatic service brake circuit. It is therefore able to implement braking requests of a driver assistance system or of an autopilot device independently of the functioning of an electric brake pressure regulating process of the electropneumatic service brake device (EBS).

However, it is not necessary for the redundancy of the electric service brake circuit of the electropneumatic service brake device in the form of the "active" foot-operated brake module to open-loop or closed-loop control brake pressures in a wheel-specific or wheel-group-specific fashion. This is because the probability of a plurality of faults occurring simultaneously (to be precise a fault in the steering device and a fault in the service brake device) is very low. It is also not necessary for functions such as ABS, TCS or ESP which are required only in exceptional cases still to be able to be carried out in the event of a fault. Other functions which are not relevant to safety, such as e.g. lining wear control or the like, are not necessary in this situation either.

In order now to make the execution of the braking request generated by the autopilot device or by the driver assistance system more fail safe overall, the electric-pneumatic service brake device is supplied by the first electric energy supply circuit or the first electric energy source, while the "active" foot-operated brake module is supplied by the second electric energy supply circuit or the second electric energy source.

The braking request signals of the autopilot device are input, in particular, not only into the electropneumatic service brake device but also into the "active" foot-operated brake module or "also read in" by the "active" foot-operated brake module, e.g. on a databus to which both devices are connected.

If a failure or a fault then occurs in the first electric energy supply circuit or in the first electric energy source or else in the electric service brake circuit of the electropneumatic service brake device, this is detected by the active FBM, e.g. through the absence of the messages of the electropneumatic service brake device on the databus or through an explicit fault message of the electropneumatic service brake device. It is also possible for the electropneumatic service brake device to be monitored by another control unit and for it then to transmit a fault message to the "active" foot-operated brake module. This other control unit can also be part of the autopilot device or of the driver assistance system.

The "active" foot-operated brake module can then implement the braking specifications of the autopilot device or of the driver assistance system instead of the electropneumatic service brake device.

Because such a foot-operated brake module or such a service brake valve device can output a variable pressure between a minimum pressure and a maximum pressure which corresponds to the supply pressure in the compressed air supply it is also ensured that the braking effect in the event of a fault does not turn out to be lower than in the normal case. This is because in the normal case only a brake pressure which corresponds at maximum to the supply pressure can also be requested.

The electric equipment therefore preferably comprises an autopilot device or a driver assistance system which device or system inputs steering and/or braking request signals into the steering device and/or into the service brake device without involvement of the driver, wherein the steering and/or braking request signals are generated, in particular, as a function of driving operation conditions. Such driving operation conditions are to be understood as all conceivable conditions and circumstances which occur during a driving operation of a vehicle such as, for example, yawing behavior, rolling behavior and/or pitching behavior, braking behavior or acceleration behavior, as well as the distance and/or the relative speed with respect to a vehicle traveling ahead or else behavior in the stationary or parked state.

In this context, the steering and/or braking request signals of the autopilot device or of the driver assistance system, which are generated without the involvement of the driver, are preferably input into the steering device and into the electropneumatic service brake device and/or into the electropneumatic service brake valve device.

This is preferably carried out by connecting control units of the autopilot device, of the driver assistance system, of the steering device, of the electropneumatic service brake device and/or of the electropneumatic service brake valve device to a common databus.

In particular, according to a first embodiment, the electronic brake control device of the electropneumatic service brake device or electronics which differ therefrom is/are embodied in such a way that it/they detect(s) a failure or fault in the second electric energy supply circuit, in the second electric energy source or in the steering device, wherein the electronic brake control device or the electronics then actuate the electropneumatic service brake device in such a way that the latter implements the steering request signals, output by the autopilot device or the driver assistance system, in the form of wheel-specific or side-specific braking interventions, at the wheel brake actuators.

This first embodiment has, however, the disadvantage that the electropneumatic service brake device no longer receives any information about the steering and braking request signals of the driver both in the event of failure of the first electric supply circuit or of the first electric energy source as well as of the second electric supply circuit or of the second electric energy source, and therefore can implement said steering and braking request signals only via their at least one pneumatic service brake circuit. If a steering braking intervention requires the electropneumatic service brake device to switch off, for design reasons, the at least one pneumatic service brake circuit, said service brake device could no longer comply with the service braking request of the driver.

In order to compensate for this disadvantage, according to a second embodiment there is provision that at least one electric signal generator is provided, which is supplied with electrical energy by the first electric energy source or by the first energy supply circuit, can be activated by the service brake activation element. When the service brake activation element is activated, it inputs an electrical activation signal into the electronic brake control device or electronics which differ therefrom. In this context, the electric signal generator can be integrated into the electropneumatic service brake valve device and can be formed, in particular, by an electric switch.

According to a third embodiment, at least one electric signal generator is provided. The at least one electric signal generator is supplied with electrical energy by the first electric energy source or by the first energy supply circuit, and can be activated by the pneumatic brake pressure or brake control pressure in the at least one pneumatic service brake control circuit. When the service brake activation element is activated, it inputs an electrical activation signal into the electronic brake control device or electronics which differ therefrom. In this context, the electric signal generator can be integrated into the electropneumatic service brake valve device and can be formed, in particular, by an electric pressure sensor.

In the second and third embodiments, the electronic brake control device or the electronics is/are embodied, in particular, in such a way that it/they detect(s) a failure or fault in the second electric energy supply circuit in the second electric energy source or in the steering device, and the steering request signals which are output by the autopilot device or the driver assistance system are ignored and not implemented when such a fault is detected and when the activation signal is present.

According to one development, the steering device has an, in particular, hydraulic power steering system.

Therefore, a sensor system is provided. The sensor system is preferably additional with respect to the electric brake value generator and is supplied with electrical energy by the same first electric supply circuit as the electropneumatic service brake device, and detects that the driver wishes to brake. In this case, even when a fault is detected in the steering device no steering brake intervention is carried out since the driver is clearly in position and can assume control. The braking then takes place only with the at least one pneumatic service brake circuit of the electropneumatic brake service device. However, the second embodiment is not suitable for representing a redundancy of a power steering system of the steering device.

According to a fourth embodiment, the electropneumatic service brake valve device is additionally supplied with electrical energy by the first electric energy source or by the first energy supply circuit.

In the third and fourth embodiments, the electric service brake circuit of the electropneumatic service brake device receives the driver braking request even in the event of the failure of the first electric supply circuit or of the first electric energy source, and can implement said request. As a result, the brake pressures in the wheel brake actuators can be correspondingly modified for steering braking, and therefore both the driver braking request and the steering request can be implemented simultaneously. These embodiments are therefore also suitable for representing a redundancy of a power steering system of the steering device.

According to a further embodiment, the electronic evaluation device of the service brake valve device or electronics which differ therefrom is/are embodied in such a way that it/they detect(s) a failure or a fault in the first electric energy supply circuit, in the first electrical energy source or in the electric service brake circuit of the electropneumatic service brake device. The electronic evaluation device or the electronics then actuates/actuate the service brake valve device in such a way that the latter implements the braking request signals output by the autopilot device or by the driver assistance system in the form of braking interventions at the wheel brake actuators.

As stated above, in the invention the at least one control piston of the service brake valve device may be loaded not only by the first activation force when a braking request which is independent of the driver's request is present, but also by a second activation force which acts on the at least one control piston which is generated independently of a driver's braking request on the basis of electrical signals which are output by the electronic control device of the service brake valve device. The second activation force may be applied in parallel with the first activation force, and in the same direction as or in the opposite direction to the first activation force.

In other words, the first activation force which is dependent on a driver's braking request and/or the second activation force when a braking request is present which is independent of the driver's request, act in a parallel fashion on the control piston of the service brake valve device (the second activation force is generated on the basis of electrical signals which are output by the electronic control device of the service brake valve device). Consequently, either both activation forces (first and second activation forces) are together capable of activating the control piston and therefore also the double seat valve of the service brake valve, or else each activation force is individually capable of activating the control piston and therefore also the double seat valve of the service brake valve without the presence of the respective other activation force. In this context, the two activation forces can act on the control piston in the same direction or in opposite directions.

The first activation force which is generated as a function of a driver's braking request always acts on the at least one control piston in the same direction, specifically conditioned by the activation direction of the braking activation element in the direction of opening of the outlet seat of the double seat valve for aerating the at least one service brake circuit. Thus, the terms "in the same direction" or "in the opposite direction" are defined with respect to the direction of action of the first activation force. In the event of a first activation force not being present owing to a lack of a driver's braking request, the direction of action of said activation force on the at least one control piston is merely virtual, in order to be able to specify a reference for the direction of action of the second activation force which is then parallel with respect thereto.

Therefore, new control possibilities of the electropneumatic service brake device arise in that now the at least one pneumatic service brake circuit can, in addition to activation by the driver, now also be activated in an automated fashion electrically or electronically and therefore without the involvement of the driver when a braking request is present. The control or regulation of the at least one pneumatic service brake circuit of the electropneumatic service brake device by the electronic control device of the service brake valve device can then be carried out by any electrical control signals of any vehicle system or of any "authorized element" which can generate a braking request.

The advantages which can be achieved thereby are basically the fact that, within the actual pneumatic channel of an electropneumatic service brake valve device or of a foot-operated brake module, brake pressures or brake control pressures can be generated automatically for pneumatic service brake circuits independently of a driver's braking request. Therefore, corresponding brake pressures can then be generated, in particular, already in the service brake valve device, i.e. at a central location and for all the pneumatic service brake circuits which are connected to the service brake valve device, without the involvement or influence of the driver, in particular when a fault or a failure of the electric brake circuit of the electropneumatic service brake device has been detected, (in particular in the electrical energy supply thereof), in the electronic brake control device, or in the electropneumatic modulators. As a result, in the event of a fault or failure of the electric service brake circuit a further electric service brake circuit is also available and is then controlled by the electronic control device of the service brake valve device.

This meets the precondition that slight changes in an electropneumatic service brake valve device according to the prior art extend its functionality advantageously in the sense of an automatic brake control process which is brought about without the involvement of the driver, in that the electronic control device of said control process has open-loop or closed-loop control algorithms added to it by which the second activation force can then be generated using a preferably additionally provided electric, electro-hydraulic or electropneumatic actuator which is actuated by the electronic control device of the foot-operated brake module.

A service brake device which is provided with such a service brake valve device reacts in the case of automatic (extraneous) activation as well as in the case of a driver's braking request, for example with respect to the braking force distribution or the control of the trailer brakes. The service brake valve device is then suitable, in particular, for (partially) autonomous driving of the vehicle, as described above, within a vehicle column, since when a fault occurs in the electric service brake circuit, a braking operation which is controlled in an automated fashion is still possible via the at least one pneumatic service brake circuit.

Furthermore, the invention satisfies the fault tolerance which is requested for vehicle brakes by legislators. Furthermore, since the invention provides an additional at least partial electric service brake circuit whose electric component extends as far as the actuator which generates the second activation force, brake circuits with different designs are available with respect to the at least one pneumatic service brake circuit which then reduces the risk of both brake circuits being put out of operation by an identical or similar fault. Consequently, with the additional (partially) electric service brake circuit it is possible to output the maximum available braking power, since the at least one pneumatic service brake circuit can make use of the full supply pressure from a compressed air supply. Last but not least, existing electropneumatic service brake devices can easily be equipped by exchanging the service brake valve device with the invention, without the need to make a change to the electric cabling or pneumatic piping on the vehicle.

It is also essential for the invention that the driver can at any time override the braking request brought about by the second activation force by activating the braking activation element of the service brake valve device, because then the first activation force which is based on the driver's braking request is applied to the at least one control piston in parallel with the second activation force, which first actuation force is, under certain circumstances, larger than the second activation force and also directed in the opposite direction thereto.

This is because in many cases it may be desirable or necessary for the driver's braking request which is represented by the first activation force acting on the control piston to be overridden by generating a second activation force which is of corresponding magnitude and acts in the opposite direction, for example when in the case of column driving described above the driver would suddenly like to initiate a full braking operation at a short distance in each case from the vehicle driving ahead and the vehicle traveling behind, which would result in the risk of a rear-end accident.

Such a second activation force is particularly preferably also generated when a fault or a failure of the electric service brake circuit of the electropneumatic service brake device has been detected and when a braking request is present. In particular, the electronic brake control device, at least one electropneumatic axle modulator or else the electrical channel of the electropneumatic service brake valve can be effected by such a fault or a failure. However, a failure of the electric energy supply of the electric service brake circuit is also conceivable.

Of course, when there are a plurality of pneumatic channels of the service brake valve device, more than just a single control piston can be loaded by the second activation force or just a single control piston can be loaded, which then transmits the second activation force to a further activation piston.

The second activation force is preferably generated by at least one electric, electro-hydraulic or electropneumatic actuator. In this context, embodiments are then conceivable in which the second activation force is generated using an electropneumatic, electro-hydraulic or electro-mechanical actuator, such as e.g. solenoid valve, electric motor etc., which then acts directly or indirectly on the at least one control piston of the service brake valve device.

According to one development, the actuator for generating the second activation force includes at least one electropneumatic solenoid valve device which outputs at least one pneumatic control pressure as a function of the electrical signals for forming the second activation force. In response to a signal of the electronic control device of the service brake valve device, a control pressure is then output which acts directly or indirectly on the at least one control piston. This control pressure then generates the second activation force at the at least one control piston. Therefore, the second activation force is particularly preferably generated electropneumatically with the best possible use of the already present conditions at the service brake valve device.

In particular, in this context the control pressure which is output by the at least one solenoid valve device is measured by a sensor system and is regulated by comparison with a setpoint value in the electronic control device. The sensor system, the solenoid valve device together with the electronic control device form a control pressure regulator for regulating the pneumatic control pressure.

Therefore, there is preferably quite generally provision that at least one of the second activation force which acts on the at least one control piston, the activation travel, of the at least one control piston of the service brake valve device from the application of the second activation force and a variable which generates the second activation force (e.g. the abovementioned pneumatic control pressure), are measured as actual variables and compared with a setpoint variable as part of a closed-loop control. By using the here optional closed-loop control of the second activation force or of one of the above variables related thereto it is possible to increase the accuracy of the brake pressure setting.

In order to implement such a closed-loop control function it is possible to provide sensors which measure the variables (e.g. the second activation force which acts on the at least one control piston, the activation travel, of the at least one control piston from application of the second activation force, and a variable which generates the second activation force) as actual variables, and provide a closed-loop controller by which the actual variable is compared with a setpoint variable as part of a closed-loop control process.

In particular, the pneumatic control pressure can be input into at least one control chamber of the electropneumatic service brake valve device, which control chamber is bounded by the at least one control piston, such that in the case of aeration the pneumatic control pressure brings about a second activation force (in the same direction as or the opposite direction to the first activation force) on the at least one control piston.

In order to implement such a functionality in the simplest way possible, a first control chamber can also be arranged with respect to the at least one control piston in such a way that, by aeration of the first control chamber, a second activation force in the same direction as the first activation force is generated on the at least one control piston. However, in addition, a second control chamber is arranged in such a way that, by aeration of the second control chamber, a second activation force which is in the opposite direction to the first activation force is generated on the at least one control piston.

In this context there can preferably be provision that the first control chamber can be aerated or vented by a first solenoid valve device or by a first control pressure regulator and the second control chamber can be aerated or vented independently thereof by a second solenoid valve device or by a second control pressure regulator.

Last but not least, the at least one control piston can be a double piston with two pistons which are connected by a piston rod, a first of which bounds the first control chamber, and a second of which bounds the second control chamber, wherein the first control chamber and the second control chamber are adjacent to faces of an inner wall of the service brake valve device which point away from one another and through which the piston rod projects in a seal-forming fashion.

The invention also relates to a vehicle having such an at least partially electric braking and steering device.

Advantageous developments of the invention can be found in the patent claims, the description and the drawings. The advantages of features and of combinations of a plurality of features which are specified in the introduction to the description are merely exemplary and can come into effect alternatively or cumulatively without the advantages necessarily having to be achieved by embodiments according to the invention. Further features can be found in the drawings, in particular the illustrated geometries and the relative dimensions of a plurality of components with respect to one another and their relative arrangement and operative connection. The combination of features of different embodiments of the invention or of features of different patent claims is also possible in ways which depart from the selected back-references of the patent claims and said combination is hereby suggested. This also relates to such features which are illustrated in separate drawings or are mentioned in the description thereof. These features can also be combined with features of different patent claims. Likewise, features, specified in the patent claims, for other embodiments of the invention can be eliminated. Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
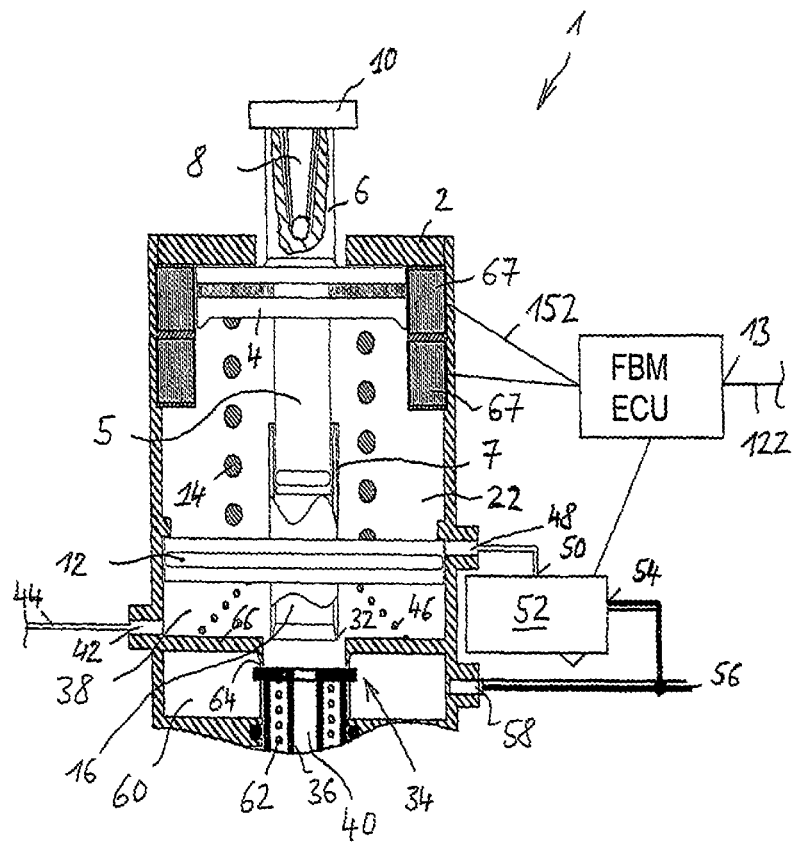
FIG. 1 shows a schematic cross-sectional illustration of a service brake valve device of an electropneumatic service brake device of a vehicle according to an embodiment of the invention in a "Drive" position.

FIG. 1 shows a schematic cross sectional illustration of a service brake valve device 1 of an electropneumatic service brake device of an electric equipment of a vehicle according to an embodiment of the invention in a "Drive" position. Electrical equipment is to be understood here as any equipment for a vehicle which comprises electric parts or components.

Figure 2:
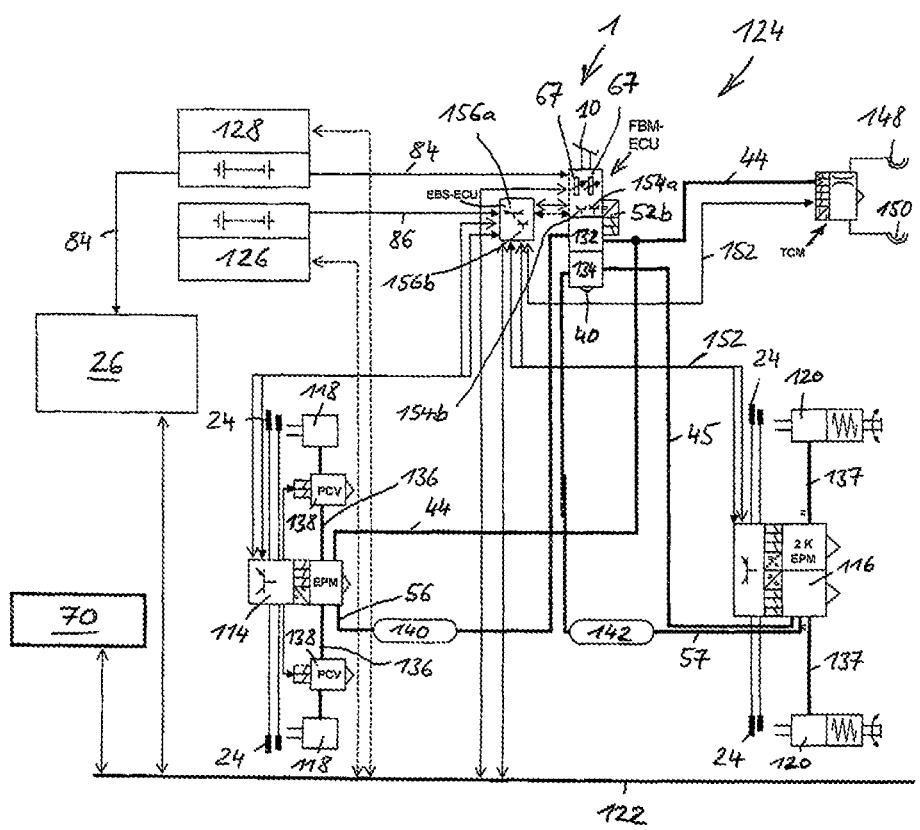
FIG. 2 shows a schematic circuit diagram of an embodiment of an electric equipment of a vehicle which contains an electropneumatic service brake device with a service brake valve device according to FIG. 1 and an autopilot device and a steering device.

The service brake valve device 1 has, for reasons of simplifying the drawings, merely one pneumatic service brake circuit or one pneumatic channel 132 or 134, but in reality preferably comprises two pneumatic service brake circuits or two pneumatic channels 132, 134 (see FIG. 2). In addition to the pneumatic service brake circuits or the pneumatic channels 132, 134 there can be an electric service brake circuit or an electrical channel 130 with a, here for example, contactless travel pick-up or brake value generator 67 for measuring the activation travel of a service brake activation element 10. The term foot operated brake module is also used with respect to such an electropneumatic service brake valve device 1.

The service brake valve device 1 is preferably used in the electropneumatic service brake device 124 according to FIG. 2 which illustrates an electronic brake system (EBS) with brake pressure regulation, in order, to input a pneumatic backup brake control pressure into each of two subordinate pneumatic (backup) service brake circuits, and to input an electrical signal, dependent on a braking request, in a superordinate electric service brake circuit, into an electronic service brake control unit EBS ECU and from there, possibly after adaptation or correction, into subordinate electropneumatic pressure regulating modules 114, 116. The subordinate electropneumatic pressure regulating modules 114, 116 output, as a function of these electrical signals representing setpoint brake pressures, a corresponding actual brake pressure to wheel brake cylinders 118, 120 of the respectively assigned axle (front axle, rear axle).

Such electropneumatic pressure regulating modules 114, 116 are sufficiently known and contain, in addition to a backup solenoid valve which retains the assigned backup brake control pressure when the electropneumatic brake circuit is intact, an inlet/outlet solenoid valve combination which is connected on the output side to a relay valve. In addition, a local electronic control unit as well as a pressure sensor for measuring the actual brake pressure output by the relay valve are integrated in to such a pressure regulating module 114, 116. The actual brake pressure which is measured by the pressure sensor is then compared, as part of a pressure regulating process, with a setpoint brake pressure which is represented by the signal which is input into the pressure regulating module 114, 116 by the electrical channel of the service brake valve device.

The service brake valve device 1 is therefore provided in order to control the electric service brake circuit as well as at least one pneumatic service brake circuit (backup brake circuit) of such an electronic brake system (EBS).

The service brake valve device 1 has a housing 2 in which a plunger piston 4 is accommodated in an axially movable fashion with a plunger receptacle 6 which projects through a cover opening of a housing cover. A plunger 8 projects from the top into the plunger receptacle 6 and is connected to a service brake activation element 10 in the form of a foot operated brake plate. If the driver therefore activates the foot operated brake plate 10, the plunger 8 presses into the plunger receptacle 6, and the plunger piston 4 is moved downward by the activation force in FIG. 1.

The plunger piston 4 transmits the activation force, preferably via a plunger piston compression spring 14, to a control piston 12 which is also mounted in an axially movable fashion in the housing 2. The control piston 12 is supported with respect to the inner wall 66 by a control piston compression spring 46.

Furthermore, the control piston 12 has a mechanically operative connection to the plunger piston 4 via a plunger piston rod 5. The plunger piston rod 5 is connected to the plunger piston 4 and if e.g. the plunger piston 4 is moved toward the control piston 12 owing to activation of the service brake activation element, the plunger piston rod 5 can impact axially in an upper control piston rod 7 (embodied as a beaker shaped sleeve) of the control piston 12 when the plunger piston rod 5 has reached the base of the sleeve shaped upper control piston rod 7. On the other hand, the plunger piston rod 5 can slide in the upper control piston rod 7 if the plunger piston 4 is moved away from the control piston 12.

On the other side of the control piston 12, an outlet seat 32 of a double seat valve 34 is formed on a lower control piston rod 16. The outlet seat 32 is either sealed against a beaker shaped, hollow valve body 36 which is mounted in an axially movable fashion in the housing 2, or lifted off therefrom to clear a flow cross section between a working chamber 38 and a head side passage opening in the valve body 36, which passage opening leads to a venting connection 40. This situation is illustrated in FIG. 1.

The working chamber 38 is connected to a connection 42 for a pneumatic service brake circuit, to which a pressure line 44 or 45, leading to an electropneumatic pressure regulating module 114, 166 of an axle (front axle, rear axle) is connected (FIG. 2). A backup solenoid valve is integrated into such a pressure regulating module 114, 116. When the electric service brake pressure is intact the backup solenoid valve shuts off the pressure conducted in the pressure line 44, 45, and thus to the wheel brake cylinders 118 and 120 which are connected to the pressure regulating module 114, 116. When the electric service brake circuit is defective the backup solenoid value conducts said pressure through. For this purpose, said backup solenoid valve is embodied, for example, as a 2/2 way solenoid valve with an open position which is spring loaded in the currentless state and an energized off position.

A control chamber 22 is formed between the plunger piston 4 and the area of the control piston 12 facing the plunger piston 4. A connection 48 on the housing 2 opens into the first control chamber 22.

An output connection 50 of a solenoid valve device 52 is connected to the connection 48, which solenoid valve device 52 is connected at its input connection 54 to a supply pressure line 56 connected to a compressed air supply. Furthermore, a supply connection 58 is present on the service brake valve device 1, to which the supply pressure line 56, which is connected to a supply chamber 60, is also connected.

The valve body 36 is forced against an inlet seat 64 of the double seat valve 34 by a valve body compression spring 62 which is supported on the floor of the housing 2 and on the interior of the valve body 36. The inlet seat 64 is formed on a radially inner edge of a central through bore of a further inner wall 66 of the housing 2. When the valve body 36 is lifted off from the inlet seat 64 counter the effect of the valve body compression spring 62, a flow cross section is cleared between the supply connection 58 or the supply chamber 60 and the working chamber 38, permitting a flow of compressed air under supply pressure into the connection 42 for the service brake circuit, (i.e. into the brake pressure line) in order to aerate the wheel brake cylinders of the respective axle or of the respective brake circuit.

As already mentioned above, FIG. 1 shows the "Drive" position of the service brake valve device 1 in which the outlet seat 32 is lifted off from the valve body 36, and the connection 42 for the service brake circuit and therefore also its wheel brake cylinder are connected to the venting connection 40. As a result, the active pneumatic wheel brake cylinders of this brake circuit are vented and therefore released.

Figures 8A, 8B, 8C:
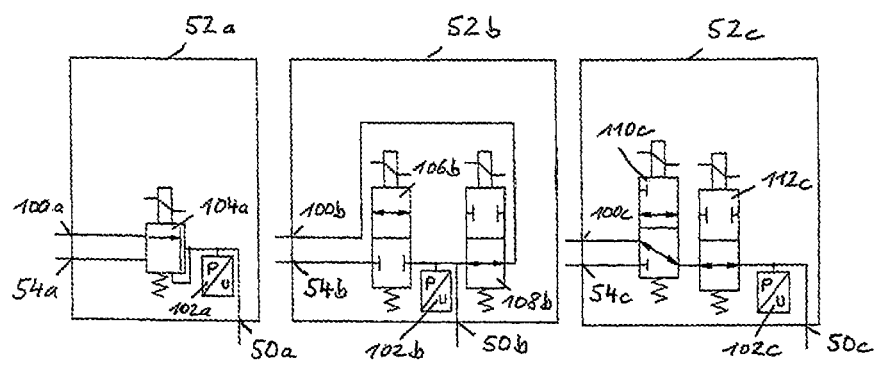
FIGS. 8A to 8C show embodiments of a solenoid valve device for controlling the service brake valve device in accordance with the invention.

The solenoid valve device 52, of which several embodiments are shown in FIG. 8a to FIG. 8b, permits aeration or venting of the first control chamber 22 and is controlled by an electronic control device FBM ECU, which will be described later in more detail.

Furthermore, two redundant travel sensors 67, which are preferably arranged axially one behind the other and preferably act in a contactless fashion, are arranged in the axial region of the plunger piston 4 as brake value generators in the housing 2, in order to measure the activation travel or the degree of activation of said plunger piston 4. The activation travel or degree of activation is proportional to the activation travel or degree of activation of the service brake activation element 10. The signals of these travel sensors 67 are used, for example, in the electrical channel of the service brake valve device 1 and input into the electronic control device FBM ECU which conditions these signals (e.g. makes them databus compatible) and inputs them via an interface 13 into a data communication line 122, e.g. a databus, to which the electronic service brake control unit EBS ECU is connected. In this respect, the electronic control device FBM ECU (also) constitutes an electronic evaluation device for the signals of the travel sensors 67.

The electronic control device FBM ECU, the first solenoid valve device 52 and the assigned cabling or pneumatic piping or pneumatic lines preferably form, together with the components of the service brake valve device 1 arranged in the housing 2, one assembly. The electronic control device FBM ECU, the first solenoid valve device 52 and the assigned cabling or pneumatic piping or pneumatic lines can also be accommodated in a separate housing which is then connected by flanges to, for example, the housing 2.

If the driver then activates the service brake activation element 10 of the service brake valve device 1, which corresponds to a driver's braking request, the plunger piston 4 is shifted downward, wherein the plunger piston 5 is forced against the floor of the beaker shaped sleeve 7, and the control piston 12 is also shifted downward until the outlet seat 32 forms a seal against the valve body 36 and therefore closes the connection between the connection 42 for the service brake circuit and the venting connection 40.

As a result no further venting of the assigned wheel brake cylinders 118, 120 can take place.

With further activation of the service brake activation element 10 in response to the driver's braking request, the valve body 36 is then forced downward with the outlet seat 32 resting on it, accompanied by lifting off from the inlet seat 64. As a result, compressed air passes under supply pressure from the supply chamber 60 into the working chamber 38 and from there into the connection 42 for the service brake circuit or into the assigned wheel brake cylinders in order to aerate and therefore engage them. This involves pure driver braking in which a first activation force is applied to the control piston 12 via the plunger piston compression spring 14 on the basis of the activation force applied to the service brake activation element 10 by the driver (the driver's braking request), said first activation force ultimately moving said control piston 12 into its aerating position.

With such a braking operation which is initiated purely by a driver's braking request, the first solenoid valve device 52 is controlled in the venting position by the electronic control device FBM ECU. In the venting position the first control chamber 22 is connected to the atmosphere, in order to avoid pressure effects which arise owing to the expansion of the first control chamber 22.

Depending on the modulation by the solenoid valve device 52 of the pneumatic control pressure which is input into the control chamber 22, it is then possible to set a defined second activation force at the second control piston 12. The application of the second activation force in turn results in a corresponding braking force. It is thus possible to set any braking force between the value of zero and a maximum braking force resulting from the supply pressure in the supply pressure line 56 or 57. In the present case, the second activation force acts, for example, in the same direction and in parallel with the first activation force. However, a directional action of the second activation force in the opposite direction is also conceivable.

If the first solenoid valve device 52 is placed in the aerating position by the electronic control device FBM ECU without a driver's braking request being present in the embodiment in FIG. 1, the first control chamber 22 is supplied with a pneumatic control pressure which in turn generates a second activation force, directed downward here, at the control piston 12, which then places said control piston 12 ultimately in its aerating position, as in the case of the activation by the driver as described above.

Furthermore, the control pressure which is present in the first control chamber 22 then also reacts on the plunger piston 4 and therefore on the service brake activation element 10, which the driver can feel at his foot when he touches the service brake activation element 10 (pedal reaction). Therefore, the driver can feel initiation of automatic braking at his foot.

In addition to a service braking operation which is initiated by the driver and a service braking operation which is initiated on the basis of service braking request signals generated in an automated fashion without involvement of the driver, a combined service braking operation is also conceivable in which the service brake valve device 1 is used for braking both in response to a driver's braking request and in response to an automatically generated braking request. Then, on the one hand, the first activation force from the driver's service braking request and also the second activation force from the automatically generated braking request act on the control piston 12, here, for example, in the same direction and in parallel, as a result of which the absolute values of the two activation forces are, for example, added together at the control piston 12.

The control pressure, which is output by the first solenoid valve device 52, for the first control chamber 22, can be subjected to pressure regelation. In this case, the actual control pressure at the output connection 50 is measured with a pressure sensor and compared with a predefined setpoint control pressure by the electronic control device FBM ECU by corresponding actuation of the first solenoid valve device 52. The solenoid valve device 52 then forms, together with the pressure sensor and the electronic control device ECU, a pressure regulator for the control pressure in the control chamber 22.

FIG. 8*a* to FIG. 8*c* illustrate examples of solenoid valve devices 52*a*, 52*b*, 52*c* or control pressure regulators 52*a*, 52*b*, 52*c* showing how they perform open loop or closed loop control of the pneumatic control pressure for the control chamber 22 in the preceding embodiments. For the sake of simplification, only the reference symbols used in FIG. 1 are entered here.

These examples have in common the fact that they are controlled by the electronic control device ECU, have an input connection 54*a*, 54*b*, 54*c* which is connected to the compressed air supply via the supply pressure line 56, and an output connection 50*a*, 50*b*, 50*c* which is respectively connected to the first control chamber 22 or to the second control chamber 24 or placed in connection therewith. Furthermore, all the embodiments have a venting line 100*a*, 100*b*, 100*c* as well as a pressure sensor 102*a*, 102*b*, 102*c* for measuring the actual control pressure at the output connection 50*a*, 50*b*, 50*c*, with the result that, in conjunction with corresponding algorithms in the electronic control device ECU which indicates the actual control pressure signal which is present at the output connection 50*a*, 50*b*, 50*c*, pressure regulation of the output control pressure is possible or is also carried out.

In the embodiment in FIG. 8*a*, a proportional valve 104*a* ensures there is a control pressure, output (proportionally) in accordance with the electrical control signal, at the output connection 50*a*, wherein aeration and venting are also possible. In the embodiment in FIG. 8*b*, an inlet/outlet valve combination composed of two 2/2 way solenoid valves 106*b*, 108*b* is provided, wherein the inlet valve 106*b* which is directly connected to the inlet connection 54*b* is closed in the non-energized state and opened in the energized state, and the outlet valve 108*b* is opened in the non-energized state and closed in the energized state. According to FIG. 8*c*, a 3/2 way solenoid valve 110*c* as an aerating and venting valve with an aerating position and a venting position is used as a solenoid valve device 52*c* in combination with a 2/2 way solenoid valve 112*c* as a holding valve which in its off position holds the pressure at the output connection 50*c*.

Such a solenoid valve device 52*a*, 52*b*, 52*c* can be used, in any of the embodiments described above, as a control pressure regulator in combination with the pressure sensor 102, which control pressure regulator includes the electronic control device FBM ECU, in order to regulate the control pressure which is present at the output 50*a*, 50*b*, 50*c*.

FIG. 2 shows a schematic circuit diagram of a preferred embodiment of an electropneumatic service brake device 124 of a traction vehicle which is suitable for coupling a trailer and has a service brake valve device 1 as described above. The service brake valve device 1 according to FIG. 1 is used there merely by way of example, wherein, for example, an electric service brake circuit and two pneumatic service brake circuits are present there.

The electropneumatic service brake device 124, and the electronic brake control device EBS ECU thereof, are supplied with electrical energy by a first electrical energy source 126 which is part of the electric service brake circuit and is independent of a second electric energy source 128 which supplies, for example, the service brake valve device 1 and, in particular, its electronic control device FBM ECU with electrical energy.

At the service brake valve device 1 it is possible to see the electrical channel 130 for the electric service brake circuit, the pneumatic front axle channel 132 for the pneumatic front axle service brake circuit, and the pneumatic rear-axle channel 134 for the pneumatic rear axle service brake circuit. It is also possible to see the pressure lines 44, 45 which feed the pressure present in the front axle channel 132 or in the rear axle channel 134 to the assigned pressure regulating module 114 or 116 where this pressure is firstly shut off with respect to the wheel brake cylinders 118, 120 by the integrated backup solenoid valve. The pressure regulating module 116 which is assigned to the rear axle is, for example, a 2 channel pressure regulating module, opposite which a 1 channel pressure regulating module 114, which is connected to the wheel brake cylinders 118 on the front axle via brake pressure lines into which ABS pressure control valves 138 are integrated, is installed on the front axle. When there is inadmissible brake slip, the ABS pressure control valves are actuated in a known fashion by the electronic brake control device EBS ECU, in order to adapt the brake slip at the wheels of the front axle to an admissible brake slip. The brake slip regulating process at the wheels of the rear axle takes place by means of the 2 channel pressure regulating module 116 there, which 2 channel pressure regulating module 116 is connected via brake pressure lines 137 to the assigned wheel brake cylinders. In order to measure wheel slip, wheel rotational speed sensors 24 are arranged on each wheel. Regulating routines of an ESP (electronic stability system), TCS (traction control system) and ABS (anti lock brake system) control means are implemented in the electronic brake control device EBS ECU.

A separate compressed air supply 140, 142 is preferably provided for each of the two service brake circuits (front axle, rear axle) which compressed air supplies 140, 142 are each connected via a supply pressure line 144, 146, on the one hand, to the respective pneumatic channel 132, 134 of the service brake valve and, on the other hand, to the pressure regulating modules 114, 116. The pressure regulating modules 114, 116 contain an inlet outlet valve combination and a relay valve which is actuated pneumatically by the latter, wherein in each case a brake pressure is respectively modulated from the supply pressure as a function of actuation by the electronic brake control device EBS ECU, and is input into the brake pressure lines 136. Furthermore, in each case a pressure sensor (which measures the respectively prevailing actual brake pressure in the brake pressure lines 136, 137 or at the "brake" coupling head and feeds it back into local electronic control devices) is integrated into the pressure regulating modules 114, 116 for each channel or in a trailer control module TCM. These local electronic control devices are each integrated into the pressure regulating modules 114, 116 or into the trailer control module TCM, in order to be able to carry out in a known fashion a brake pressure regulating process by comparison with a setpoint brake pressure.

The trailer control module TCM which is sufficiently known is controlled by compressed air in a redundant fashion via, for example, the pressure line 44 which is assigned to the pneumatic front axle brake circuit. The trailer control module TCM is also controlled electrically with priority by the electronic brake control device EBS ECU. The trailer control module TCM is, furthermore, supplied with compressed air by one of the compressed air supplies 140 or 142 by the compressed air supply line 144 or 146, which, is, however, not shown in FIG. 2. On the output side, the trailer control module TCM is connected to a "brake" coupling head 148 and to a "supply" coupling head 150, in order to control the trailer brakes in a known fashion.

It is self evident that the pressure regulating modules 114, 116, the trailer control module TCM and the ABS pressure control valves 138 are each connected to the electronic brake control device EBS ECU by means of an electric control line 152.

Furthermore, it is possible to see the electronic control device FBM ECU (which is preferably e.g. integrated into the service brake valve device 1, e.g. as embodied in FIG. 1), and the first solenoid valve device 52b. The first solenoid valve device 52b contains, for example according to FIG. 8b, an inlet/outlet valve combination 106b, 108b as well as a pressure sensor 102b. In the embodiment shown, these components are, for example, accommodated in a separate housing which is connected by flanges to the housing of the service brake valve device 1. Furthermore, the redundantly present brake value generators 67 can also be seen. The electronic control device FBM ECU contains, for example, two redundant microprocessors 154a, 154b which monitor one another. In the same way, the electronic brake control device EBS ECU also has two redundant microprocessors 156a, 156b. The wheel rotational speed sensors 24 on the wheels also signal the respective wheel rotational speed to the local control units in the pressure regulating modules 114, 116, which they then connect onward to the electronic brake control unit EBS ECU.

Figure 4:
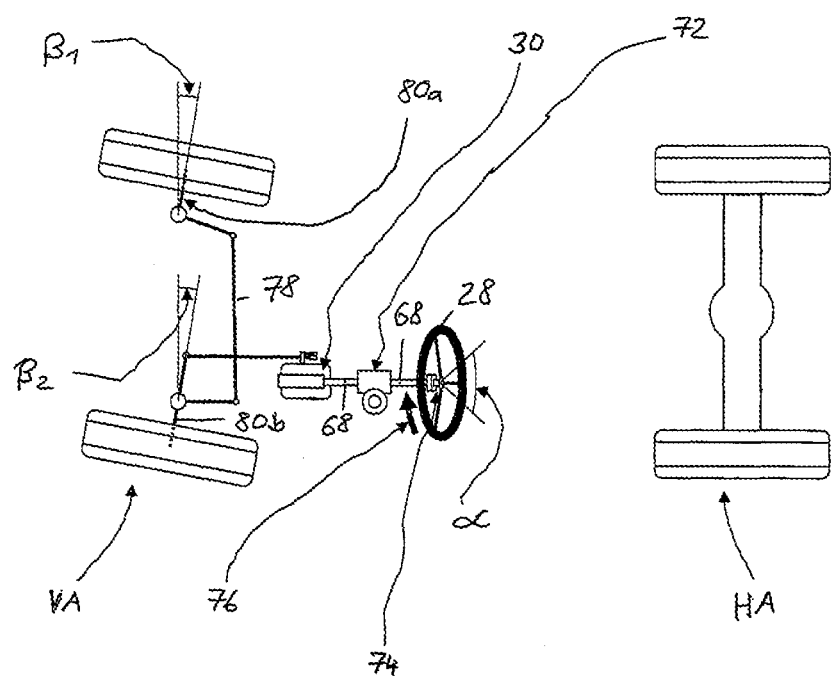
FIG. 4 shows the steering device of FIG. 2 in a situation in which the driver is steering.

The electrical equipment also comprises an electromechanical steering device 26 with, for example, a continuous mechanical connection between a steering wheel 28 and a steering gear mechanism 30 (FIG. 4). An electronic steering control unit of the steering device 26 communicates with a vehicle databus 68, to which the electronic brake control unit EBS ECU, the electronic control device FBM ECU and an autopilot device 70 are also connected. The autopilot device 70 is designed in such a way that it actuates, inter alia, the steering device 26, the electropneumatic service brake device 124 and the service brake valve device 1 and the control units thereof without the involvement of the driver, and therefore also constitutes a driver assistance system. Therefore, at least partially automated control of the brakes and of the steering of the vehicle is implemented, preferably as a function of driving operation conditions such as, for example, the vehicle speed, the distance and/or the relative speed with respect to a vehicle traveling ahead, the stability of the vehicle, in particular also in connection with the trailer etc. For this purpose, the autopilot device 70 receives, via sensors which are not shown here, data relating to driving operation conditions.

The steering device 26 is supplied with electrical energy via the second energy source 128, and for example the autopilot device 70 likewise. The trailer control module TCM which is electrically controlled by the electronic brake control unit EBS ECU is connected to a "brake" coupling head 148 and to a "supply" coupling head 150. Corresponding brake and supply lines which lead to the trailer are detachably connected to these coupling heads.

The electromechanical steering device 26 is illustrated in detail in FIG. 4. The steering wheel torque 76 which is applied by the driver via the steering wheel 28 is introduced via a steering spindle 68 into an electric steering actuator 72 which is formed, for example, by an electric motor. Furthermore, a steering wheel torque sensor 74, which senses the steering wheel torque which is respectively applied by the driver via the steering wheel 28 and is input as a steering wheel torque signal into a, here non-electronic, steering control unit which is connected to the databus 122 (FIG. 2), is mounted on the steering spindle 68.

The steering control unit can basically actuate the steering actuator 72 as a function of the steering wheel torque 76 sensed at the steering wheel 28, in order to generate an additional superimposition torque at the steering column 68 with respect to the steering wheel torque 76 applied by the driver. Therefore, the steering device constitutes here, for example, what is referred to as a superimposition steering system with superimposition of the steering torque. Instead of the steering wheel torque 76, the respective steering wheel angle a can also be sensed by a steering wheel angle sensor, with the result that a superimposition steering system with steering wheel angle superimposition would be present.

Figure 5:
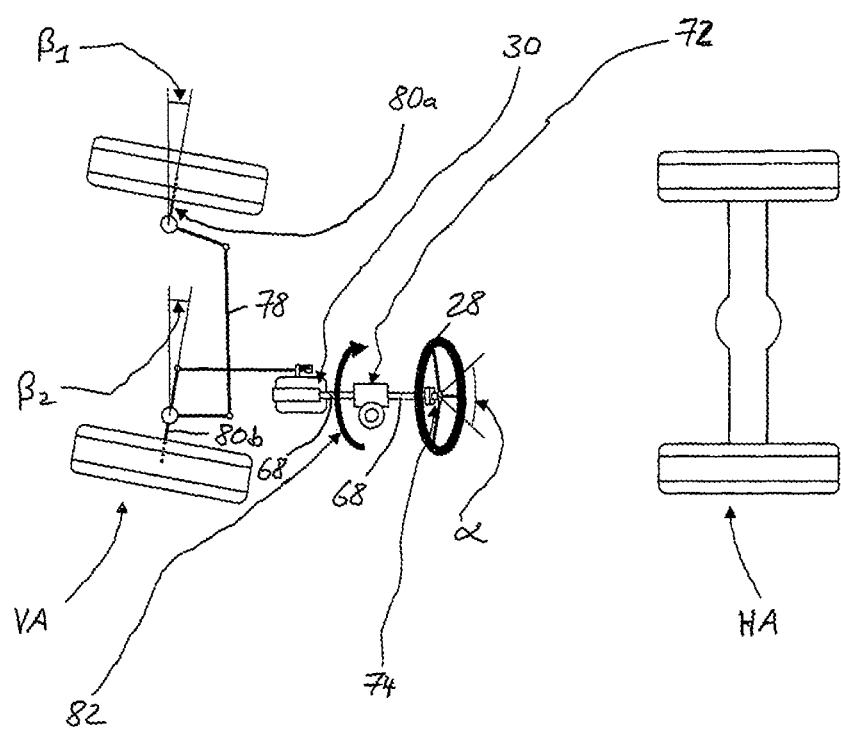
FIG. 5 shows the steering device of FIG. 2 in a situation in which the driver is steering.

However, the steering actuator 72 can also generate a steering torque 82 at the steering spindle 68 without the involvement of the driver, i.e. without activation of the steering wheel 28 (FIG. 5). In the case which is present in FIG. 4, the steering actuator 72 does not input any steering torque 82 into the steering spindle 68, with the result that the steering forces alone are derived from the steering wheel torque 76 generated by the driver. FIG. 4 shows a situation in which the steering request originates exclusively from the driver who correspondingly activates the steering wheel 28.

The steering gear mechanism 30 preferably contains here a hydraulic power steering system and boosts the steering wheel torque 76. The steering gear mechanism 30 then actuates via a steering gear linkage 78, axle stubs 80*a*, 80*b* of the left hand and right hand front wheels of the steered front axle FA, in order to set there in each case a steering angle b1 and b2 for the right and left. The rear axle RA is preferably unsteered here.

FIG. 5 shows a situation in which the steering torque 82 which acts on the steering spindle 68 is generated exclusively by the steering actuator 72 on the basis of its actuation by the electronic steering control unit. This actuation is carried out, for example, by a steering request which is output by the autopilot device 70 and is transmitted by the databus 122.

Figure 6:
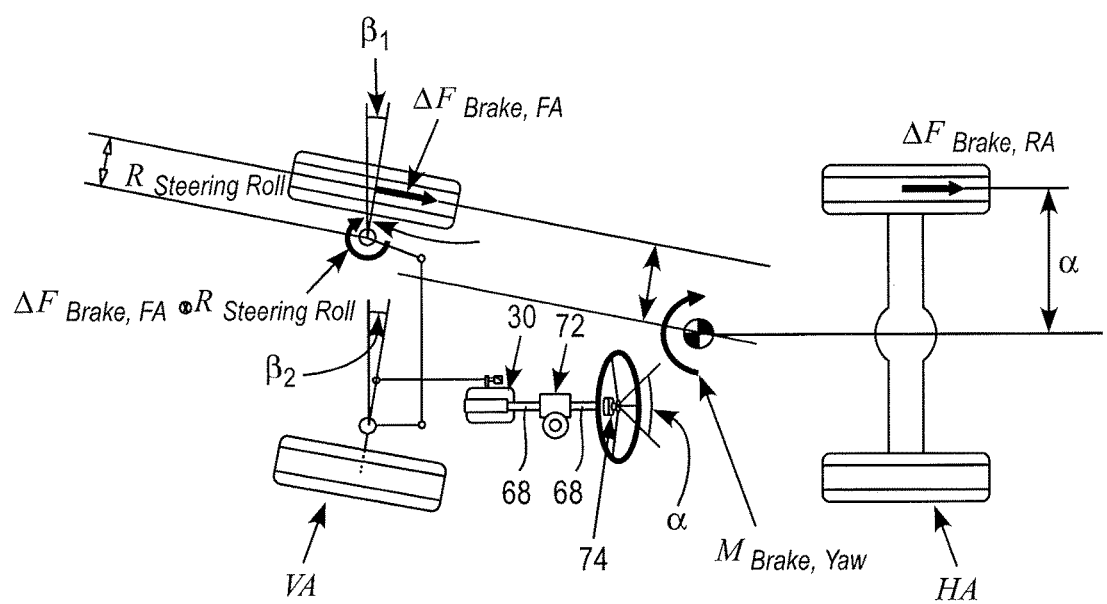
FIG. 6 shows the steering device of FIG. 2 in a situation in which the autopilot device is steering.

FIG. 6 shows what is referred to as a steering braking process in which, by selective braking of, here for example, the respective left wheel on the front axle FA and on the rear axle RA, a yawing torque $M_{Brake,Yaw}$ is generated which causes the vehicle to follow, here for example, a left handed bend path. The steering rolling radius $R_{SteeringRoll}$ at the left front wheel is decisive for the yawing torque $M_{Brake,Yaw}$ and in combination with the braking force $\Delta F_{Brake,FA}$ acting at said left front wheel it generates a braking torque $\Delta F_{Brake,FA} \cdot R_{SteeringRoll}$, and also the half axle length a, which in combination with the braking force $\Delta F_{Brake,RA}$ generates a braking torque $\Delta F_{Brake,Ra} \cdot a$. The steering braking request is initiated here by the autopilot device 70 and transmitted via the databus 122 to the electronic brake control unit EBS ECU which in response brings about the braking of the two wheels.

Figure 7:
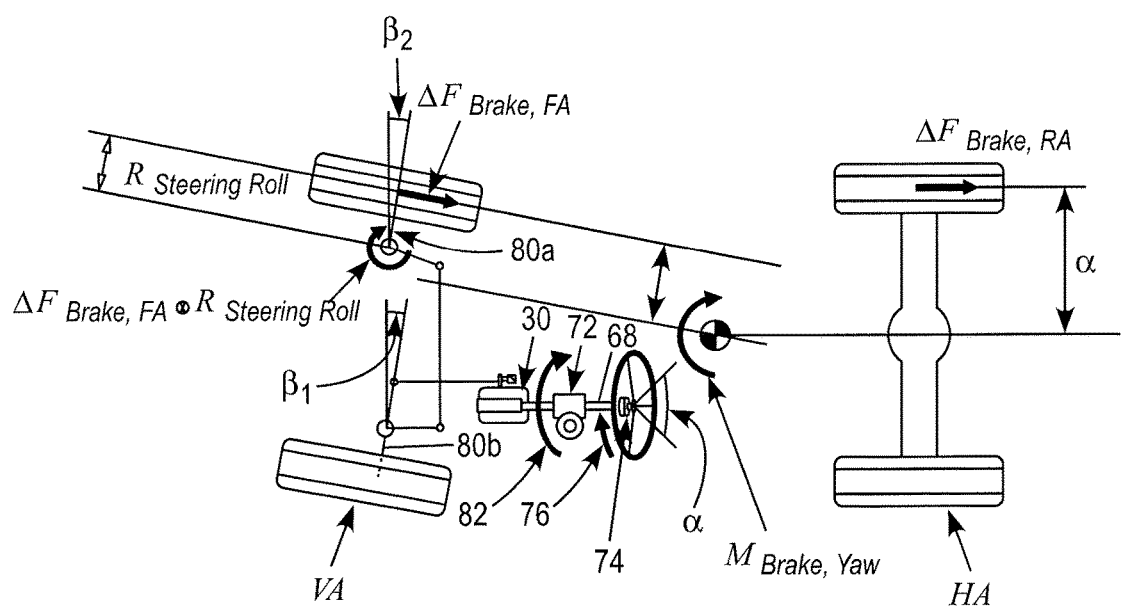
FIG. 7 shows the steering device of FIG. 2 in a situation in which the driver and the autopilot device are steering.

FIG. 7 illustrates a situation in which a steering wheel torque 76 which is applied to the steering wheel spindle 68 by the driver via the steering wheel 28 is superimposed on a steering torque 82 which is applied by the steering actuator 72. Furthermore, a yawing torque $M_{Brake,Yaw}$ is also effective owing to a steering braking process. Therefore, the case is shown here in which the possibilities of steering of the vehicle which are shown in FIG. 4 to FIG. 6 are superimposed on one another.

Figure 3:
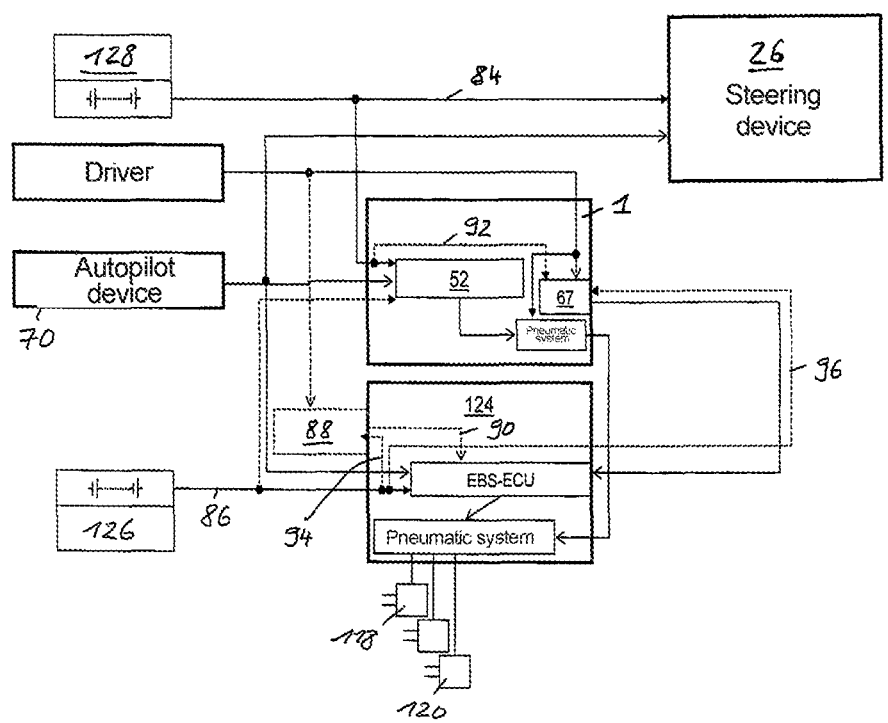
FIG. 3 shows a simplified schematic illustration of the electric equipment from FIG. 2.

FIG. 3 shows a schematic view of various embodiments of a power supply of the electric and electronic components of the electric equipment of the vehicle.

According to a first embodiment, the steering device 26 and the service brake valve device 1 or the electronic control device FBM ECU thereof are supplied with power by the second electric energy source 128, and the electropneumatic service brake device 124 or the brake control unit EBS-ECU thereof is supplied with power by the first electric energy source 126. The corresponding energy supply lines 84, 86 are characterized in FIG. 3 by unbroken lines with arrows in the form of triangular surfaces. The brake value generator 67 of the service brake valve device 1 is optionally also supplied with power here by the second electric energy source 128, as is indicated by the energy supply line 92 which is shown by dashed lines.

In this context, the electronic brake control device 1 of the electropneumatic service brake device 124 or the electronic control device FBM ECU thereof is designed in such a way that it detects a failure or fault in a second electric energy supply circuit containing the second electric energy source 128 or in the steering device 26, wherein the electronic brake control device 1 or the electronic control device FBM ECU thereof then actuates the electropneumatic service brake device 124 so that the latter implements steering request signals, possibly output by the autopilot device 70, in the form of wheel specific or side specific braking interventions at the wheel brake actuators.

According to a second embodiment there is provision that at least one electric signal generator 88, which is supplied with electrical energy, for example, by the first electric energy source 126 or by the first energy supply circuit via an energy supply line 94 (illustrated by a dashed line), and can be activated by the service brake activation element 10 is provided which, when the service brake activation element 10 is activated inputs an electrical activation signal into the electronic brake control device EBS ECU via a signal line 90 which is shown by a dashed line in FIG. 3. In this context, the electric signal generator 88 can be integrated into the electropneumatic service brake valve device 1 and formed, in particular, by an electric switch.

According to a third embodiment, at least one electric signal generator 88 which is supplied with electrical energy by the first electric energy source 126 or by the first energy supply circuit and can be activated by the pneumatic brake pressure or brake control pressure in one or both pneumatic service brake control circuit(s) can be provided, which electric signal generator 88 inputs an electrical activation signal into the electronic brake control device EBS-ECU when the service brake activation element 10 is activated. In this context, the electric signal generator 88 can in turn be integrated into the electropneumatic service brake valve device 1 and, in particular, formed by an electric pressure sensor. This brake pressure or brake control pressure which is measured by the signal generator 88 is respectively present in the pressure lines 44, 45 of the two pneumatic service brake circuits (FIG. 2). In the third embodiment, the brake value generator 67 of the service brake valve device 1 is supplied with power, for example, by the first electric energy source 126 via an energy supply line 96 (shown by a dashed line).

In the second and third embodiments, the electronic brake control device EBS ECU is designed, in particular, in such a way that when it detects a failure or fault in the second electric energy supply circuit containing the second electrical energy source 128 or in the steering device 26 and an activation signal which is generated by the signal generator 88 is present, the electronic brake control device EBS ECU ignores steering request signals which are possibly output by the autopilot device 70 and does not implement them.

Therefore, a signal generator 88 which is preferably additional with respect to the electric braking value generator 67. The signal generator 88 is supplied with electrical energy by the same first electric supply circuit 126 as the electropneumatic service brake device 124 and detects that the driver wishes to brake. In this case, even when a fault is detected in the steering device 26 no steering braking intervention is carried out, since the driver is clearly in position and can assume control. The braking process is then carried out only with the pneumatic service brake circuits of the electropneumatic service brake device 124.

According to a fourth embodiment, the electropneumatic service brake valve device 124 or the brake control unit EBS ECU thereof is additionally supplied with electrical energy by the first energy supply circuit which contains the first electric energy source 126. In this context, the braking value generator 67 of the service brake valve device 1 is supplied with power by the second electric energy source 128 via the energy supply line 92.

In the third and fourth embodiments, the electric service brake circuit of the electropneumatic service brake device 124 receives the driver's braking request even in the event of failure of the first electric supply circuit or of the first electric energy source 126, and can implement said driver's braking request. As a result, the brake pressures in the wheel brake actuators 118, 120 can be correspondingly modified for steering braking, and can therefore implement both a driver's braking request and a steering request simultaneously. These embodiments are therefore also suitable to represent a redundancy of the power steering system in the steering gear mechanism 30 of the steering device 26.

According to a further embodiment, the electronic control device FBM ECU of the service brake valve device 1 is designed in such a way that it detects a failure or a fault in the first electric energy supply circuit containing the first electric energy source 126 or in the electric service brake circuit of the electropneumatic service brake device 124. If such a failure or fault is detected, the control device FBM ECU then actuates the service brake valve device 1 so that the latter implements braking request signals possibly output by the autopilot device 70, in the form of braking interventions at the wheel brake actuators 118, 120.

The method of functioning of the electropneumatic service brake device 124 is as follows: when the superordinate electric service brake circuit of the electropneumatic service brake device 124 is intact, in the event of a driver's braking request by activation of the service brake activation element 10, an electrical braking request signal is generated in the service brake valve device 1 by the braking value generators 67 and input into the electronic control device FBM ECU of the service brake valve device 1. These signals are conditioned and introduced into the electronic brake control device EBS ECU via the databus 122. In said electronic brake control device EBS ECU, the signals are corrected by higher functions such as e.g. load dependent braking force control (ALB), differential slip control etc., and then in each case a signal representing a setpoint brake pressure is input from there into the pressure regulating modules 114, 116 or TCM. A corresponding brake pressure is modulated from the supply pressure by corresponding activation of the inlet/outlet valve combinations which are respectively present there, and is conducted into the wheel brake cylinders 118, 120, in order to engage them accordingly. The pressure sensors which are integrated in the modules 114, 116, TCM measure the actual brake pressure. The brake pressure is adapted in the sense of a brake pressure regulating process by comparison with the setpoint brake pressure which is present as a signal representing said setpoint brake pressure in the local control units. The specified processes therefore occur in the superordinate electric service brake circuit.

In parallel with this, a brake pressure is generated in the way described above by the activation of the service brake activation element 10 in the two pneumatic channels 132, 134 and then also in the pressure lines 44, 45 connected thereto, but said brake pressure can also be held back in the modules 114, 116, TCM by the backup solenoid valves which are connected in an energized state into the off position.

If a fault or defect then occurs in the superordinate electric service brake circuit (whether it be the first energy source 126, the electronic brake control device EBS ECU or one of the local control units in the modules 114, 116, TCM, which fails) the backup solenoid valves which are integrated into these modules then switch in a non energized state into their open position, as a result of which the brake pressures which are present in the pressure lines 44, 45 are conducted through the modules 114, 116, TCM to the wheel brake cylinders 118, 120 or to the "brake" coupling head, in order to engage the wheel brakes in the traction vehicle or in the trailer. However, in the event of a defect in the electric service brake circuit it is only possible for the brakes to be activated by the driver and then only in a purely pneumatic fashion.

Furthermore, the electronic control device FBM ECU of the electropneumatic service brake valve device 1 is embodied in such a way that when a fault or a failure of the superordinate electric service brake circuit of the electropneumatic service brake device has been detected and a braking request is present, said electronic control device FBM ECU actuates the first solenoid valve device 52b in order, as described above, to generate at the control piston 12 a second activation force which is able, even without a driver's braking request, to lift off the valve body 36 from the inlet seat 64. The lifting off aerates the pressure lines 44, 45 leading to the modules 114, 116, TCM, with a brake pressure which is formed in accordance with the second activation force. Since the backup solenoid valves there are switched in a non energized state into their open positions, this brake pressure then passes into the wheel brake cylinders 118, 120 or into the "brake" coupling head 148.

A failure or a fault of the electric service brake circuit is detected, in particular, within the scope of self monitoring, by the electronic brake control device EBS ECU of the electropneumatic service brake device 124 itself or within the scope of external monitoring by the electronic control device FBM ECU of the electropneumatic service brake valve device 1. However, external monitoring by an electronic control device of any third system is also conceivable. The communication is carried out here preferably via the databus 122. Since the electronic control device FBM ECU of the service brake valve device 1 is supplied with power by the second energy source 128 which is independent of the first energy source 126, this functionality is also not prevented by a failure of the first energy source 126.

The second electric energy source can be represented, for example, by a separate battery, (double layer) capacitors, a further energy store or else a separate power generating unit (e.g. compressed air operated generator). The second energy source is preferably monitored for charging capacity and functional capability (SOC, SOH, regular charging/discharging). This can be done, for example, by the electronic brake control device EBS ECU of the electropneumatic service brake device 124, the electronic control device FBM ECU of the service brake valve device 1 or by some other system such as e.g. the battery monitoring system of a hybrid drive controller of the vehicle.

The braking request can originate here from any system of the vehicle, here, in particular, from the autopilot device 70 or, for example, also from an adaptive cruise control (ACC) system by which the distance or the relative speed with respect to a vehicle traveling ahead is kept constant. The functionality of such an ACC system can then be maintained even when the electric service brake circuit of the service brake device 124 has failed.

The automatically generated braking request or the automatically generated braking request signal is then input as an electrical signal via the interface 13 into the control device FBM ECU of the service brake valve device 1, in order to generate the second activation force at the control piston 12. Since this interface 13 is preferably connected to the databus 122 (via which not only the communication with the electronic control device EBS ECU of the service brake device 124 takes place but also the communication with electronic control devices of a number of further electronic vehicle systems which include, in particular, at least one driver assistance system such as an ACC), the braking request signal can be generated automatically by any system of the traction vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Service brake valve device
2 Housing
4 Plunger piston
5 Plunger piston rod
6 Plunger receptacle
7 Upper control piston rod
8 Plunger
10 Service brake activation element
12 Control piston
13 Electrical connection
14 Plunger piston compression spring
16 Lower control piston rod
22 Control chamber
24 Wheel rotational speed sensor
26 Steering device
28 Steering wheel
30 Steering gear mechanism
32 Outlet seat
34 Double seat valve
36 Valve body
38 Working chamber
40 Venting connection
42 Connection of service brake circuit
44 Brake pressure line
45 Brake pressure line
46 Control piston compression spring
48 Connection
50 Output connection
52 First solenoid valve device
54 Input connection
56 Supply pressure line
57 Supply pressure line
58 Supply connection
60 Supply chamber
62 Valve body compression spring
64 Inlet seat
66 Inner wall
67 Travel sensor
68 Steering spindle
70 Autopilot device
72 Steering actuator
74 Steering wheel angle sensor
76 Steering wheel torque
78 Steering linkage
80a/b Axle stub
82 Steering torque
84 Energy supply line
86 Energy supply line
88 Signal generator
90 Signal line
92 Energy supply line
94 Energy supply line
96 Energy supply line
104 Proportional valve
106 2/2 way solenoid valve
108 2/2 way solenoid valve
110 3/2 way solenoid valve
112 2/2 way solenoid valve
114 Pressure regulating module
116 Pressure regulating module
118 Wheel brake cylinder
120 Wheel brake cylinder
122 Databus
124 Service brake device
126 First energy source
128 Second energy source
130 Electrical channel
132 Pneumatic front axle channel
134 Pneumatic rear axle channel

What is claimed is:

1. A braking system of a vehicle having an at least partially electrical braking and steering device, comprising
a steering system having an electric or electromechanical steering device, a steering gear mechanism, an electronic steering control device and an electric steering actuator; and
an electronic or electronically brake pressure regulated brake system having
an electropneumatic service brake device, the electropneumatic service brake device including an electropneumatic service brake valve device and an electronic brake control device,
at least one electric service brake circuit having electropneumatic modulators,
at least one electric service brake circuit having pneumatic wheel brake actuators associated with wheels of the vehicle, and
a service brake activation element,
wherein
the electronic brake control device is configured to electrically control the electropneumatic modulators to generate pneumatic brake pressures or brake control pressures for the pneumatic wheel brake actuators on at least one of a specific wheel basis, a specific axle basis and a specific vehicle side basis, the at least one electric service brake circuit includes
at least one electrical channel includes at least one electric brake value generator configured to sense activation of the service brake activation element and has output corresponding activation signals, and
at least one electronic evaluation device is configured to receive the activation signals and input braking request signals based on the activation signals into the electronic brake control device, and the at least one pneumatic service brake circuit includes
at least one pneumatic channel configured to load at least one control piston of the service brake valve device with a first activation force corresponding to activation of the service brake activation element representing a driver's braking request, and
the service brake valve device is configured such that when the at least one control piston is loaded with the first activation force, the control piston directly or indirectly controls at least one double seat valve of the service brake valve device having an inlet seat and an outlet seat to generate pneumatic brake pressures or brake control pressures for actuation of the pneumatic wheel brake actuators, the braking system further comprising:
a device containing the electronic evaluation device of the electropneumatic service brake valve device configured to generate a second activation force independently of a driver's braking request by loading a second activation force on the at least one control piston in the same direction as or in the opposite direction to the first activation force when a braking request which is independent of the driver's request is present;
a first electrical energy source or a first energy supply circuit configured to supply energy to the electropneumatic service brake device independently from a second electrical energy source or a second energy supply circuit configured to supply energy to the electropneumatic service brake valve device and to the electric or electro mechanical steering device.

2. The braking system as claimed in claim 1, wherein
the brake pressure in the pneumatic wheel brake actuators is closed-loop or open-loop controlled solely pneumatically when the service brake activation element is activated when a fault in the electric service brake circuit is present, and
otherwise the brake pressure in the pneumatic wheel brake actuators is closed-loop or open-loop controlled either
electrically,
solely pneumatically except when predefined critical conditions are present under which a vehicle movement dynamics controller which is configured to intervene electrically by a braking intervention or steering braking intervention generates electrical braking intervention control signals, or
pneumatically in some of the pneumatic wheel brake actuators separate from pneumatic control of others of the pneumatic wheel brake actuators.

3. The braking system as claimed in claim 1, wherein
the electropneumatic service brake device is configured to control at least one of an electronic stability function and an anti-lock brake function in combination with a traction control function with traction control valves on front and rear axles of the vehicle.

4. The braking system as claimed in claim 1, wherein
the electronic brake control device is configured to receive, without the involvement of the driver, at least one of steering and braking request signals from at least one of an autopilot system and a driver assistance system generated as a function of driving operation conditions.

5. The braking system as claimed in claim 4, wherein
the at least one of steering and braking request signals are input into the steering device and into at least one of the electropneumatic service brake device and the electropneumatic service brake valve device.

6. The braking system as claimed in claim 5, wherein
respective control units of at least two of the autopilot system, of the driver assistance system, the steering device, the electropneumatic service brake device and the electropneumatic service brake valve device are connected to a databus.

7. The braking system as claimed in claim 6, wherein
in the event of a failure or fault in the second electric energy supply circuit, in the second electric energy source or in the steering device, the electropneumatic service brake device supplied by the first electric energy supply circuit or the first second electric energy source controls wheel-specific or side-specific braking interventions at the wheel brake actuators in response to steering request signals generated independent of the driver.

8. The braking system as claimed in claim 6, wherein
at least one electric signal generator supplied with electrical energy by the first electric energy source or by the first energy supply circuit is configured to be activated by the service brake activation element to output an electrical activation signal to the electronic brake control device.

9. The braking system as claimed in claim 8, wherein
the electric signal generator is an electric switch integrated into the electropneumatic service brake valve device.

10. The braking system as claimed in claim 6, wherein
at least one electric signal generator supplied with electrical energy by the first electric energy source or by the first energy supply circuit is configured to be activated by the pneumatic brake pressure or brake control pressure in the at least one pneumatic service brake control circuit to output an electrical activation signal to the electronic brake control device.

11. The braking system as claimed in claim 10, wherein
the electric signal generator is an electric pressure sensor integrated into the electropneumatic service brake valve device.

12. The braking system as claimed in claim 8, wherein
the electronic brake control device is configures such that when a failure or fault in the second electric energy supply circuit, the second electric energy source, or in the steering device (26) is present, steering request signals generated independent of the driver are not implemented.

13. The braking system as claimed in claim 5, wherein
in the event of a failure or fault in the first electric energy supply circuit, in the first electric energy source, or in the electric service brake circuit of the electropneumatic service brake device, the electronic evaluation device of the service brake valve device actuates the service brake valve device such that the service brake valve device implements braking request signals generated independent of the driver in the form of braking interventions at the wheel brake actuators.

14. The braking system as claimed in claim 1, wherein the electropneumatic service brake valve device is additionally supplied with electrical energy by the first electric energy source or by the first energy supply circuit.

15. The braking system as claimed in claim 1, wherein the device for generating the second activation force includes at least one electric, electro hydraulic or electropneumatic actuator.

16. The braking system as claimed in claim 15, wherein the device for generating the second activation force includes at least one electropneumatic solenoid valve device which outputs at least one pneumatic control pressure as a function of the electrical signals for forming the second activation force.

17. The braking system as claimed in claim 16, wherein the pneumatic control pressure output by the at least one solenoid valve device is measured by a sensor system and is regulated by comparison with a setpoint value in the electronic control device, and the sensor system, the solenoid valve device and the electronic control device form a control pressure regulator for regulating the pneumatic control pressure.

18. The braking system as claimed in claim 17, wherein the electropneumatic service brake valve device is configured to receive the pneumatic control pressure in at least one control chamber, and the at least one control chamber is bounded at least in part by the at least one control piston and is configured such aeration of the at least one control chamber results in the loading of the second activation force on the at least one control piston.

19. The braking system as claimed in claim 1, wherein the steering device includes hydraulic power steering system.

20. A vehicle having a braking system as claimed in claim 1.

* * * * *